Sept. 13, 1932.  F. M. DAVIS  1,877,560
VERTICAL CONTINUOUS MILLING MACHINE
Filed April 30, 1930    4 Sheets-Sheet 3
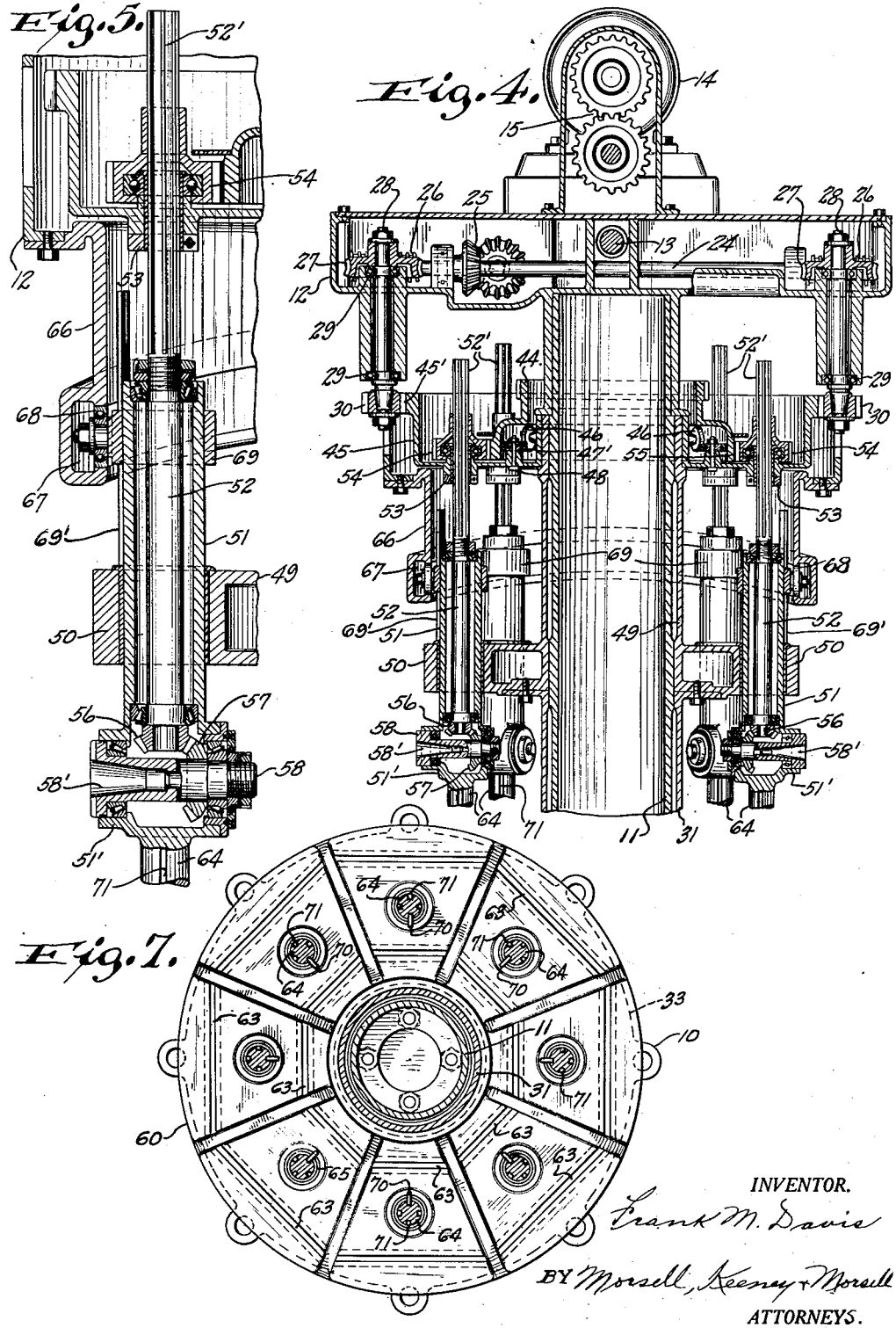
INVENTOR.
Frank M. Davis
BY Morsell, Keeney & Morsell
ATTORNEYS.

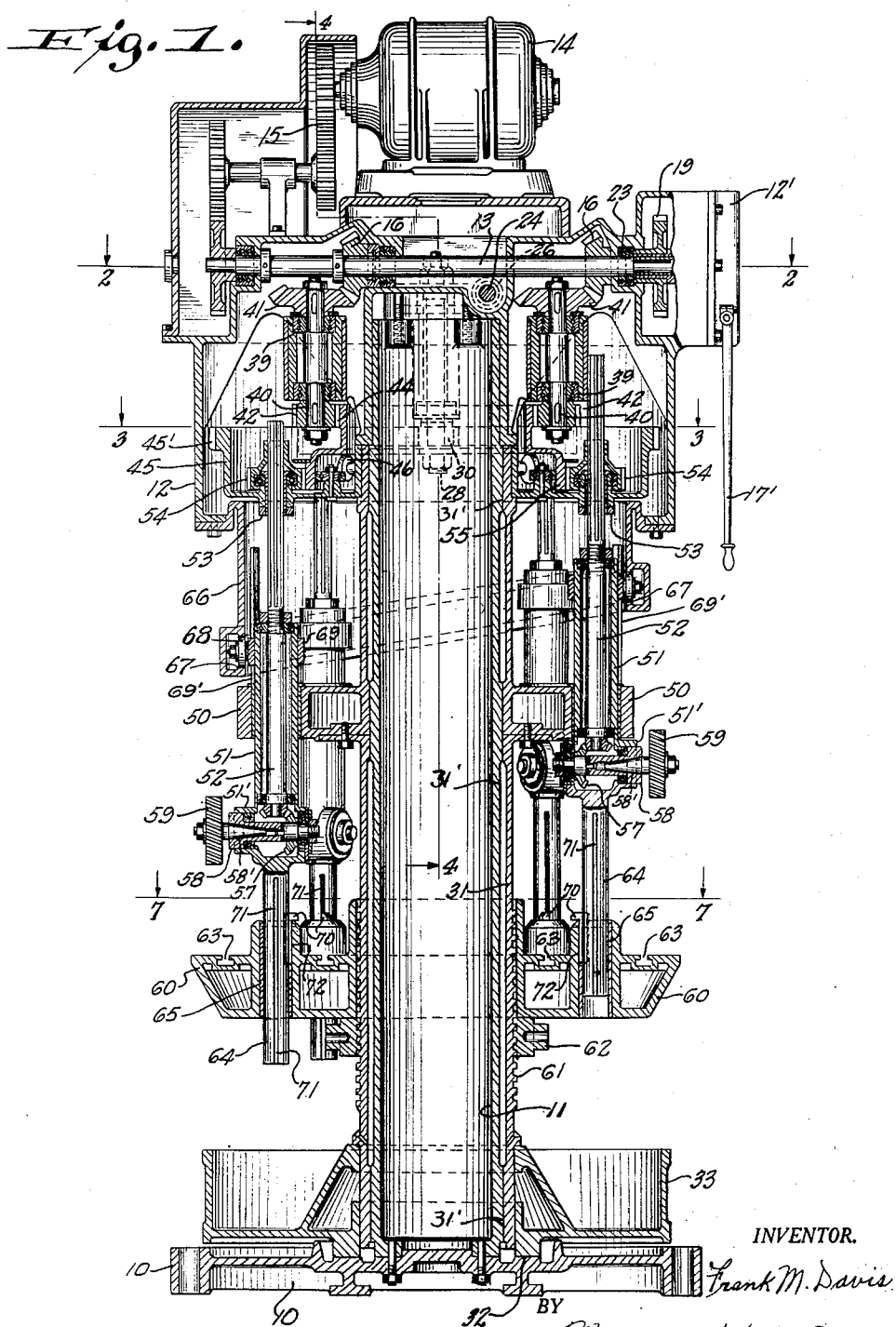

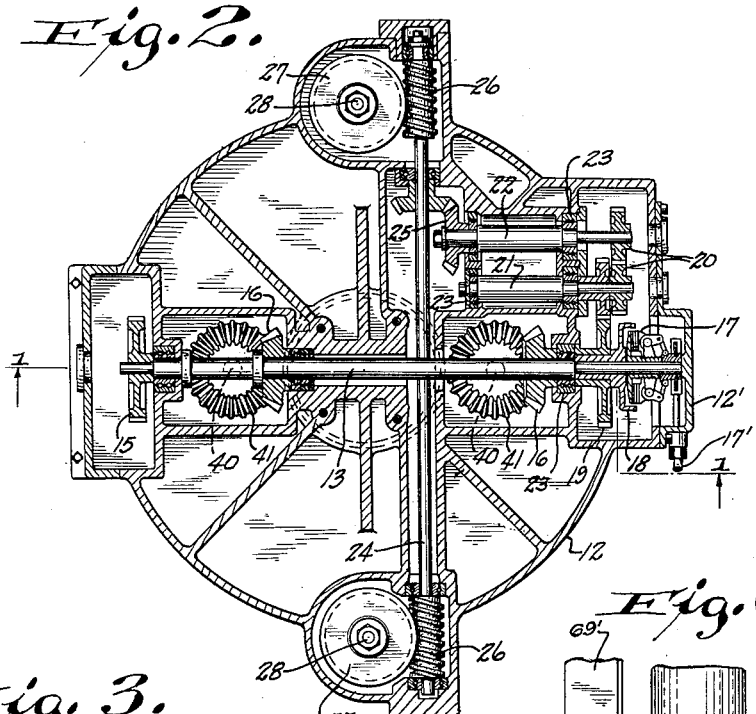
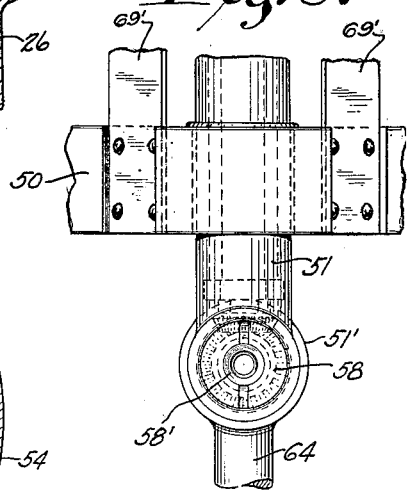
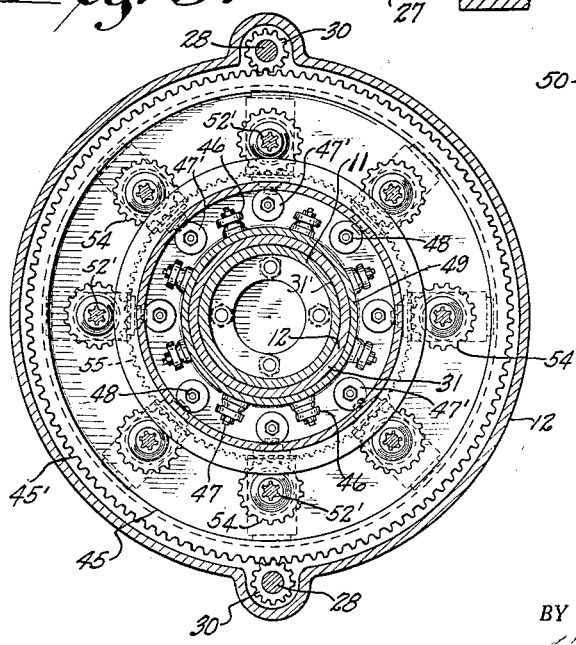

Sept. 13, 1932.  F. M. DAVIS  1,877,560
VERTICAL CONTINUOUS MILLING MACHINE
Filed April 30, 1930  4 Sheets-Sheet 4
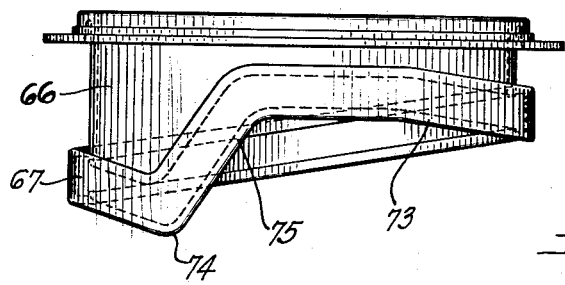
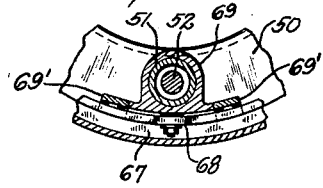
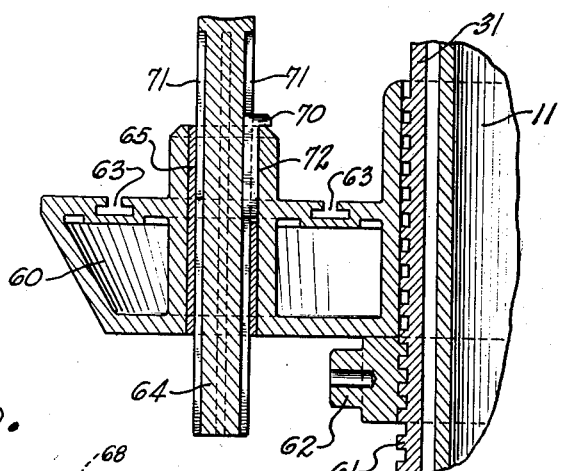
INVENTOR.
Frank M. Davis
BY
Morsell, Keeney & Morsell
ATTORNEYS.

Patented Sept. 13, 1932

1,877,560

UNITED STATES PATENT OFFICE

FRANK M. DAVIS, OF MILWAUKEE, WISCONSIN

VERTICAL CONTINUOUS MILLING MACHINE

Application filed April 30, 1930. Serial No. 448,554.

This invention relates to improvements in vertical continuous milling machines more particularly adapted for milling a large number of like parts.

It is one of the objects of this invention to provide a vertical continuous milling machine having a plurality of milling cutters arranged to permit continuous milling of work which may be mounted on a moving part of the machine at one point and removed at another point, the milling operation being completed between the two points.

A further object of the invention is to provide a vertical continuous milling machine in which the milling cutters or other work instrumentalities are automatically raised from the work when the operation is completed to permit the removal of the completed parts and the mounting of other parts to be worked upon.

A further object of the invention is to provide a vertical continuous milling machine having pick-off gears between drive and transverse shaft and between transverse shaft and machine rotating shaft to permit various relative speed changes of the parts.

A further object of the invention is to provide a vertical continuous milling machine in which the milling cutter spindles and the work supporting table are adjustable to permit use of cutters of different diameters and work of different sizes.

A further object of the invention is to provide a vertical continuous milling machine having equalizing drive to cutter spindles and rotation of machine and table.

A further object of the invention is to provide a vertical continuous milling machine having means for taking the end thrust of the tooth pressure of the gears.

A further object of the invention is to provide a vertical continuous milling machine in which the double spur gear of the driving mechanism is mounted in a novel manner to eliminate friction.

A further object of the invention is to provide a vertical continuous milling machine in which each cutter spindle shaft is guided by the table which holds the work.

A further object of the invention is to provide a vertical continuous milling machine which is of simple construction, is strong and durable and is well adapted for the purpose described.

With the above and other objects in view the invention consists of the improved vertical continuous milling machine and its parts and combinations as set forth in the claims, and all equivalents thereof.

In the accompanying drawings in which the same reference characters indicate the same parts in all of the views:

Fig. 1 is a vertical sectional view of the improved vertical continuous milling machine taken on line 1—1 of Fig. 2;

Fig. 2 is a horizontal sectional view thereof taken on line 2—2 of Fig. 1;

Fig. 3 is a horizontal sectional view thereof taken on line 3—3 of Fig. 1;

Fig. 4 is a vertical sectional view of the upper portion of the machine taken on line 4—4 of Fig. 1;

Fig. 5 is an enlarged detail vertical sectional view of one of the cutter spindles and connected parts;

Fig. 6 is a front detail view of the cutter spindle shown in Fig. 5;

Fig. 7 is a horizontal sectional view of the machine taken on line 7—7 of Fig. 1;

Fig. 8 is a side view of the cam member for reciprocating the milling cutters;

Fig. 9 is a sectional detail view of the means for preventing the rotation of the spindle bearings;

Fig. 10 is a detail view, partly in section, of one of the spindles and connected parts; and Fig. 11 is a sectional detail view taken on line 11—11 of Fig. 10.

Referring to the drawings the numeral 10 indicates a base member or support to which a vertical tubular standard 11 is connected. A circular frame or casing 12, formed for convenience of manufacture in several parts, is fixedly mounted on the upper end portions of the standard and at its upper end portion a horizontal shaft 13 is journaled and enclosed therein. An electric motor 14 mounted on the upper portion of the casing 12 has a gear train connection 15 with one end of the upper horizontal shaft 13. Said horizontal shaft also has a pair of bevel gears 16 mounted medially of its length and a clutch 17 mounted on the end portion of said shaft opposite to the end connected to the gear train 15. The complementary clutch member 18 which is clutched to the shaft 13 by the clutch 17, has connected thereto a gear 19. Said gear forms part of a gear chain 20 mounted on short shafts 21 and 22 journaled in the circular casing. All of said shafts rotate in ball bearings 23 to reduce friction.

A clutch lever 17' depending from the casing 12 provides for moving the clutch member into and out of clutching engagement with its complementary clutch member.

A casing cover 12' permits access to the gear train 20 so that said gears may be removed and replaced by others of different relative diameters to change the speed ratio of the parts to suit the work involved.

A lower horizontal worm shaft 24 journaled in the circular casing and extending at right angles to the upper shaft 13 has a bevel gear driving connection 25 with the short shaft 22 and at its opposite ends is provided with worms 26. The worms 26 mesh with worm wheels 27 which are mounted on the upper ends of short vertical shafts 28. Said vertical shafts are journaled in ball bearings 29 mounted on the circular casing 12, and at their lower end portions are provided with pinions 30.

A vertically extending sleeve 31 journaled at 31' on the standard 11 is provided with a lower bearing portion 32 which rests upon the base member 10 to support and permit the free turning of the sleeve thereon. Said bearing portion is extended to form an oil chamber 33 to receive oil which may drop down from the parts.

The upper circular casing 12 adjacent the upper end of the standard 11 and beneath the horizontal shaft 13 is provided with ball bearings 39 to receive short vertical shafts 40. Said shafts 40 are positioned on diametrically opposite sides of the standard 11 and the upper ends thereof are provided with bevel gears 41 which are in mesh with and driven by the bevel gears 16. The lower ends of the vertical shafts 40 are provided with pinions 42 which are in mesh with the upper toothed portion of a double gear ring 44.

A large ring gear 45 of angular form in cross-section surrounds and is rigidly mounted on the upper end portion of the vertically extending sleeve 31 and the teeth 45' forming the gear are on the outer periphery thereof and are in mesh with the pinions 30 which rotate the ring gear and connected parts.

A plurality of vertical rollers 46 journaled on shafts 47 projecting radially from the ring gear 45 support the double gear ring 44, and a plurality of horizontal rollers 47' journaled on vertical shafts 48 arranged in spaced relation around the ring gear 45, bear against the inner periphery of the double gear ring and in combination with the vertical rollers form the bearing for said double gear ring and take the side thrust of the tooth pressure of meshing pinions.

A spindle sleeve tool carrier 49 mounted fast on the revoluble vertical sleeve 31 is provided with outwardly projecting vertically extending bearings 50 for slidably receiving spindle bearing housings 51 having therein anti-friction bearings of the end thrust type to reduce end thrust friction. Rotary spindles 52 journaled in said spindle bearing housings 51 extend slidably upwardly therefrom through rotary bearings 53 journaled in the ring gear 45. The portions 52' which extend slidably through the rotary bearings 53 are longitudinally grooved or castellated to slidably connect with the pinions 54 through which they extend. The hub portions of the pinions 54 extend above the bearings 53 to engage and rotate the spindles 52 while the pinions are in mesh with and rotated by the lower and larger diameter gear 55 forming part of the double gear ring 44. The lower ends of the spindles have bevel pinions 56 mounted thereon. Said pinions are in mesh with bevel pinions 57 mounted on short horizontal tool shafts 58 which in turn are journaled in enlargements 51' of the spindle bearing housings 51. The tool shafts 58 extend radially with relation to the axes of the housings 51 and are formed with tapered bores 58' for receiving tapered shafts of milling cutters 59 or other work instrumentalities for working on articles clamped to the supporting table or tables 60 vertically adjustable mounted on the vertical sleeve 31 and turning therewith. The sleeve is threaded as indicated by the numeral 61 and a nut 62 positioned beneath the work table 60 and threaded on said sleeve, holds the work table in adjusted position. The tables 60 are provided with dovetail grooves 63 for convenience in clamping work or work holding jigs thereto.

The lower portions of the reciprocal bearing housings 51 are formed with downwardly projecting guide extensions 64 which extend through bearings 65 forming part of the work table 60 to prevent lateral play of the housings and chattering of the cutters.

The lower portion of the upper circular casing 12 is provided with a fixed depending circular casing 66 having a vertical cam groove 67 formed around the outer sides of the spaced reciprocal bearing housings 51. Ball bearing rollers 68 connected to and journaled radially on the outer side portions of the reciprocal bearing housings 51 extend into the cam grooves 68 and said housings are reciprocated thereby while the sleeve 31 is turning around the standard. The rollers 65 are connected to the bearing housings 51 by means of collars 69 and the housings are prevented from rotating in their supports by means of keys 70 which extend into keyways 71 and 72 formed in the guide extensions 64 and the work table bearings 65. Any number of keyways may be formed in the guide extensions 64 to permit adjusting the cutter circumferentially for different kinds of work. It is to be understood that other means for adjusting the angle of the cutters with relation to the standard may be used as desired.

The collars 69 are further prevented from turning by means of guides 69' which engage opposite sides of the collars as clearly indicated in Figs. 10 and 11. Said guides are secured to the bearing portions 50.

Referring to Fig. 8 the numeral 73 indicates the point of engagement of the spindle bearing rollers with the cam at the start of the downward movement of the bearing housings and the milling cutters, and 74 the point of lowest position of said housings and cutters in moving around the standard. The cam portion 75 between said points 73 and 74 moves the cutters upwardly and away from the work and provides the necessary time period during which the articles are either clamped to or removed from the work table while the vertical sleeve upon which the tables are mounted is relatively, slowly turning around the standard.

In operation the articles to be worked are mounted on jigs or other holding means on the tables and as the sleeve and the tables turn to have the rollers of the spindle bearing housings engage the cam surfaces starting at 73, the milling cutters or other work instrumentalities will be gradually moved downwardly to engage the articles to be worked. By the time each article reaches the end or lowest point 74 of the cam 67, the work on the respective article at the corresponding point below will be completed and the article will be removed and replaced by another during the travel through the space indicated by the numeral 75 to provide for the continuous operation of the machine. The clutch lever 17' provides for the manual control of the rotation of the vertical sleeve 31 and connected parts, and if it is desired to change the speed of the tool carrier with relation to the speed of rotation of the cutters, other gears are substituted for the gears 20 to provide the desired ratio.

From the foregoing description it will be seen that the vertical continuous milling machine is of simple construction, is strong and durable and is well adapted for continuous and large production of work.

What I claim as my invention is:

1. A vertical continuous milling machine, comprising a vertical standard, a tool carrier journaled thereon and having a plurality of circumferentially spaced and vertically movable spindles, tool shafts rotated by the spindles and extending at an angle thereto, work holding means turning with the carrier, guide means for said tool shafts coacting with said work holding means, means for moving the tool shafts towards and away from the work in successive order as the carrier revolves around the standard, milling cutters carried by the tool shafts, and means for rotating the spindles.

2. A vertical continuous milling machine, comprising a vertical standard having a cam extending therearound, a tool carrier journaled on the standard and having a plurality of circumferentially spaced and vertically movable spindles, tool shafts journaled on the carrier and extending at an angle to and driven by the spindles, milling cutters carried by the tool shafts, work holding means turning on the standard, guide means for said tool shafts coacting with said work holding means, the said spindles and tool shafts being moved towards the work by the cam as the carrier revolves around the standard, means for moving the spindles and tool shafts away from the work, and means for rotating the spindles.

3. A vertical continuous milling machine, comprising a vertical standard having a cam extending therearound, a tool carrier journaled on the standard and having a plurality of circumferentially spaced and vertically movable spindles, tool shafts journaled on the carrier and extending at an angle to and driven by the spindles, tool instrumentalities carried by the tool shafts, work holding means mounted on the carrier in position to be engaged by the tool instrumentalities and movable therewith, guide means for said tool shafts coacting with said work holding means, the spindles and tool shafts being moved towards and away from the work by the cam, means for revolving the carrier, and means for rotating the spindles.

4. A vertical continuous milling machine, comprising a vertical standard having a cam member extending therearound, a sleeve journaled on the standard and having at its upper portion a carrier provided with a plurality of circumferentially spaced and vertically extending spindles, horizontally extending tool shafts journaled on the carrier and driven by lower portions of the spindles, work holding members mounted on the sleeve for holding work to be engaged by cutters carried by the tool shafts, guide means for said tool shafts coacting with said work holding members, the spindles and tool shafts being moved towards and away from the work holding means by the cam member as the carrier revolves around the standard, means for revolving the sleeve on the standard, and means for rotating the spindles.

5. A vertical continuous milling machine, comprising a vertical standard having a cam extending therearound, a sleeve journaled on the standard and having at its upper portion a plurality of circumferentially spaced and vertically extending housings, spindles journaled in said housings, horizontally extending tool shafts carried by the sleeve and having geared connections with the spindles, work holding members mounted on the sleeve below the tool shafts and in working alinement therewith, guide means for said housings coacting with said work holding members, the said housings and tools being moved towards and away from the work by the cam as the sleeve revolves around the standard, means for revolving the sleeve on the standard, and means for rotating the spindles.

6. A continuous working machine, comprising a bearing member, a tool carrier journaled thereon, work holding means turning with the carrier, horizontally extending milling cutters turning with the carrier and positioned to engage work mounted on the holding means, means coacting with said holding means for guiding said cutters, means for moving the milling cutters towards and away from the work during the turning of the carrier, and a double gear ring means for rotating the milling tools.

7. A continuous working machine, comprising a vertical standard, a tool carrier journaled thereon and having a plurality of circumferentially spaced and vertically extending spindles, horizontally extending tool spindles having a toothed engagement with and driven by the vertical spindles, work holding means turning with the carrier for holding work in vertical alinement with milling cutters carried by the tool spindles, guide means above and below said horizontal spindles for confining the same to vertical movement, means for moving the tool spindles towards and away from the work in successive order as the carrier revolves around the standard, and a double gear ring means for rotating the vertical spindles.

8. A continuous working machine, comprising a vertical standard having a cam extending therearound, a tool carrier journaled on the standard and having a plurality of circumferentially spaced and vertically extending spindles, horizontally extending tool spindles having a toothed engagement with and driven by the vertical spindles, work holding means turning on the standard with the carrier for holding work in vertical alinement with milling cutters carried by the tool spindles, the said spindles and milling cutters being moved towards the work by the cam as the carrier revolves around the standard, means for moving the spindles and milling cutters away from the work, guide means above and below said horizontal spindles for confining the same to vertical movement, and a double gear ring means for rotating the vertical spindles.

9. A continuous working machine, comprising a vertical standard having a cam extending therearound, a sleeve journaled on the standard and having at its upper portion a tool carrier journaled on the standard and provided with a plurality of circumferentially spaced and vertically extending spindles, horizontally extending tool spindles having a toothed engagement with and driven by the vertical spindles, work holding members mounted on the sleeve for holding work in vertical alinement with milling cutters carried by the tool spindles, the said spindles and tool spindles being moved towards and away from the work by the cam as the carrier revolves around the standard, guide means above and below said horizontal spindles for confining the same to vertical movement, means for revolving the sleeve on the standard, and a double gear ring means for rotating the spindles.

10. A vertical continuous milling machine, comprising a vertical standard having a cam extending therearound, a sleeve journaled on the standard and having at its upper portion a plurality of circumferentially spaced and vertically extending reciprocal housings, vertical spindles journaled in said housings, horizontal tool spindles journaled in said housings and having a toothed engagement with the vertical spindles, work holding members mounted on the sleeve below the tool spindles and in working alinement with milling cutters carried by the tool spindles, the said housings and spindles and milling cutters being moved towards the work holding members by the cam as the sleeve revolves around the standard, guiding means for said housings coacting with said work holding members, means for revolving the sleeve on the standard, and a double gear ring means for rotating the spindles.

11. A vertical continuous milling machine, comprising a base member having a vertical standard and a cam extending around the upper portion of the standard, a sleeve journaled on the standard and having at its upper portion a plurality of circumferentially spaced and vertically extending spindles, horizontally extending tool spindles having a toothed engagement with the lower portions of the spindles, work holding members mounted on the sleeve in working alinement with milling cutters carried by the tool spindles, the said spindles and milling cutters being moved towards and away from the work holding members by the cam as the sleeve revolves around the standard, gear means for revolving the sleeve on the standard, means for guiding said tool spindles from said work holding members, and a double gear ring means for rotating the spindles.

12. A vertical continuous milling machine, comprising a base member having a vertical standard and a cam extending around the upper portion of the standard, a sleeve journaled on the standard and having at its upper end a plurality of circumferentially spaced and vertically reciprocal end thrust bearings, pinions carried by the standard and positioned above the bearings, vertical spindles journaled in and extending through the bearings and slidably engaging the pinions, horizontally extending tool spindles journaled in the bearings and having toothed engagement with the vertical spindles, a geared means for revolving the sleeve, a double gear ring carried by the sleeve and in mesh with the pinions for rotating the vertical spindles while they are being reciprocated and carried by the sleeve, a vertical shaft carried by the standard and having a pinion meshing with one of the gears of one of the double gear ring for rotating said double gear ring, and means for rotating the vertical shaft, work holding members carried by the sleeve and positioned below the tool spindles, said bearings and tool spindles being moved downwardly towards and upwardly away from the work holding members by the cam.

13. A vertical continuous milling machine, comprising a vertical standard, a tool carrier journaled on the standard and having a plurality of circumferentially spaced and horizontally extending tool spindles for holding milling cutters, work holding means turning with the carrier, means for moving the tool spindles towards the work holding means for a portion of their travel around the standard, means for moving the tool spindles away from the work holding means for another portion of the travel of the tool spindles around the standard, guide means above and below said horizontal spindles for confining the same to vertical movement, a gear wheel for rotating all of the tool spindles, means on the opposite sides of the gear wheel for rotating said gear wheel, and means for rotating the tool carrier.

14. A vertical continuous milling machine, comprising a vertical standard, a tool carrier journaled on the standard and having a plurality of circumferentially spaced and vertically extending housings having downwardly projecting guide extensions, vertical spindles journaled in the housings, horizontally extending tool spindles journaled in the housings and having a toothed engagement with the vertical spindles, work holding means turning with the carrier and having bearings through which the guide extensions reciprocate, means for moving the spindles towards and away from the work holding means, a gear wheel for rotating all of the spindles, means for rotating said gear wheel, and means for rotating the tool carrier.

15. A vertical continuous milling machine, comprising a vertical standard, a tool carrier journaled on the standard and having a plurality of circumferentially spaced and vertically extending housings having downwardly projecting guide extensions, vertical spindles journaled in the housings, horizontally extending tool spindles journaled in the housings and having a toothed engagement with the vertical spindles, work holding means turning with the carrier and having bearings through which the guide extensions reciprocate, means for moving the spindles towards the work holding means for a portion of their travel around the standard, means for moving the tool spindles away from the work holding means for another portion of the travel of the tool spindles around the standard, a gear wheel for rotating all of the tool spindles, means for rotating said gear wheel, and means for rotating the tool carrier.

16. A vertical continuous milling machine, comprising a vertical standard and a cam extending around the upper portion of the standard, a sleeve journaled on the standard and having at its upper portion a plurality of circumferentially spaced and vertically extending reciprocal end thrust bearing housings, vertically extending spindles journaled in said housings, horizontally extending tool spindles for holding work tools journaled in the housings and having a toothed engagement with the vertical spindles, work holding means adjustably mounted on the sleeve below the tool spindles, the said tool spindles being moved downwardly towards the work holding means by a portion of the cam as the sleeve revolves around the standard, another portion of the cam moving each tool spindle away from the work holding means when the vertical spindles reach the active end of the cam, means for guiding said housings closely adjacent to the work on said work holding means, a gear means for revolving the sleeve on the standard, bearing rollers carried by the standard, and a double gear ring means bearing on the rollers for rotating the tool spindles.

17. A vertical continuous milling machine, comprising a vertical standard, a tool carrier journaled on the standard and having a plurality of circumferentially spaced and vertically extending reciprocal spindles, horizontally extending tool spindles having a toothed engagement with the vertical spindles for holding work tools, said tool carrier having anti-friction end thrust bearings in which the spindles are journaled, work holding means turning with the tool carrier, means for moving the spindles and tool spindles towards the work holding means for a portion of the travel of the spindles around the standard, means for moving the spindles away from the work holding means for another portion of the travel of the tool spindles away from the work holding means, guide means above and below said horizontal spindles for confining the same to vertical movement, means for rotating all of the tool spindles, and means for rotating the tool carrier.

18. A vertical continuous milling machine, comprising a vertical standard, a tool carrier journaled on the standard and having a plurality of circumferentially spaced and vertically extending reciprocal spindles, horizontally extending tool spindles having a toothed engagement with the vertical spindles for holding work tools, said tool carrier having anti-friction end thrust bearings in which the spindles and tool spindles are journaled, work holding means turning with the tool carrier, means for moving the tool spindles towards the work holding means for a portion of the travel of the spindles around the standard, means for moving the tool spindles away from the work holding means for another portion of the travel of the tool spindles around the standard guide means above and below said horizontal spindles for confining the same to vertical movement, a motor mounted on the standard, and means driven by the motor and including a train of gears for rotating the tool spindles and the tool carrier, the gears of said train of gears being easily removable and replaceable by other gears to change the speed ratio between the tool spindles and the tool carrier.

19. In combination, a standard, a tool carrier revoluble about said standard, a plurality of rotary spindles carried by said carrier, tool shafts rotatable by said spindles about axes disposed at an angle to the spindle axes, work holding means revoluble with said carrier, means for sliding said spindles longitudinally relative to said carrier toward and away from said work holding means during revolution of said carrier about said standard, and means on opposite sides of said tool shafts for guiding said spindles to prevent lateral displacement thereof.

In testimony whereof I affix my signature.

FRANK M. DAVIS.